US007594235B2

(12) United States Patent
Moreau

(10) Patent No.: US 7,594,235 B2
(45) Date of Patent: Sep. 22, 2009

(54) METHOD OF EXECUTING ON A STATION OF A COMMUNICATION NETWORK A COMPUTER PROGRAM REPRESENTED IN A MARKUP LANGUAGE

(75) Inventor: Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 10/610,523

(22) Filed: Jul. 2, 2003

(65) Prior Publication Data

US 2004/0040028 A1   Feb. 26, 2004

(30) Foreign Application Priority Data

Jul. 4, 2002   (FR)   .................. 02 08374

(51) Int. Cl.
  G06F 3/00   (2006.01)
  G06F 15/16   (2006.01)
  G06F 17/00   (2006.01)
(52) U.S. Cl. .................. 719/310; 709/203; 709/217; 715/234
(58) Field of Classification Search .................. 719/330, 719/328, 310; 709/203, 217; 715/324, 234
See application file for complete search history.

(56) References Cited

U.S. PATENT DOCUMENTS

| 4,442,486 | A  | * | 4/1984  | Mayer ...................... 726/23   |
| 5,956,483 | A  | * | 9/1999  | Grate et al. .................. 709/203 |
| 6,490,564 | B1 | * | 12/2002 | Dodrill et al. ............... 704/275  |
| 6,799,184 | B2 | * | 9/2004  | Bhatt et al. .................. 707/102  |
| 7,089,567 | B2 | * | 8/2006  | Girardot et al. ............. 719/330   |
| 7,111,077 | B1 | * | 9/2006  | Starkovich et al. .......... 709/246   |
| 2002/0069130 | A1 |   | 6/2002  | Moreau ........................ 705/26  |
| 2002/0107867 | A1 | * | 8/2002  | Takagi et al. ................ 707/102  |
| 2002/0107999 | A1 |   | 8/2002  | Zimmermann et al. ...... 709/330 |
| 2002/0138595 | A1 |   | 9/2002  | Ruellan et al. .............. 709/219  |
| 2003/0028559 | A1 |   | 2/2003  | Moreau .................... 707/501.1  |
| 2003/0035122 | A1 |   | 2/2003  | Amarger et al. ............. 358/1.1   |
| 2003/0055916 | A1 |   | 3/2003  | Fablet et al. ................ 709/219  |
| 2006/0168644 | A1 | * | 7/2006  | Richter et al. ................. 726/2  |

(Continued)

FOREIGN PATENT DOCUMENTS

EP   1 065 592   3/2001
FR   2 795 535   12/2000

OTHER PUBLICATIONS

J. Burns, et al., "eXtensible Programming Language (XPL) Specification", Jul. 22, 2000. <URL:vbxml.com/XPL/spec_draft.asp>.
A. Clinick, "Remote Scripting" MSDN Library, Apr. 21, 1999. <URL:msdn.microsoft.com/library/en-us/dnclinic/hmtl/scripting041299.asp>.

* cited by examiner

Primary Examiner—Lechi Truong
(74) Attorney, Agent, or Firm—Fitzpatrick, Cella, Harper & Scinto

(57) ABSTRACT

A method of execution on a station of a communication network of a computer program represented in a markup language comprises a step of reading a tag comprising the identification of an instruction; a step (S40) of identifying an electronic address associated with the tag comprising the identification of an instruction; a step (S41) of comparing the electronic address with the local address of the station; and, if the electronic address is different from the local address, a step (S43, S45) of sending a request to a server station of the network corresponding to the electronic address for obtaining the execution of the instruction, if the electronic address refers to the local address, executing the instruction at the local. Use in particular for executing a computer program distributed over different servers of a communication network.

17 Claims, 6 Drawing Sheets

METHOD OF EXECUTING ON A STATION OF A COMMUNICATION NETWORK A COMPUTER PROGRAM REPRESENTED IN A MARKUP LANGUAGE

TECHNICAL FIELD

The present invention relates to a method of executing a computer program on a station of a communication network.

BACKGROUND OF THE INVENTION

This computer program is represented in a markup language, using for example the syntax of the markup language XML ("eXtended Markup Language").

The importance of communication networks in the use of computers is continuously growing such that, increasingly, the computer programs themselves, in order to operate, need to be connected to other computers via a communication network.

Thus it is not rare for a computer program to be shared over a communication network, using the functions and processing capacities of each server of the communication network optimally.

Hence the execution of such a program on a local computer, without connection to the communication network, can no longer be carried out, or else only in a degraded mode.

It is thus becoming increasingly important to be able to have access to the functions provided by the different programs stored on the different servers of a communication network.

Several techniques currently exist for accessing and using remote computer programs.

A first technique known as RPC ("Remote Procedure Call"), enables a local program to send a request for execution of a function to a remote program which executes the function and returns the requested result.

Nevertheless, this RPC technique has a certain number of drawbacks. Firstly, it requires the definition of the function to be remotely executed to be precisely known in advance. Moreover, it requires the programmer to considerably modify the code of his program in order to for it to be able to access remote functions. Finally, the programmer must process differently local function invocations and remote function invocations.

A second technique also exists consisting of downloading a function on demand.

This technique consists of downloading a first part of a program from a remote server, then, progressively as the execution of this program invokes functions contained in other parts of the program, downloading these other parts from a remote server.

This technique is implemented by virtue of the programming language Java®, used by certain Web browsers.

Although simple to use, this technique requires that the entirety of the program to execute be initially stored on the remote server, which prevents the use of distributed models in which the program is divided into several subprograms shared between different computers of the communication network.

Furthermore, this technique does not enable the downloading from a plurality of computers of the network of the different sub-programs making up a program.

In parallel with this technique of processing a program shared over a communication network, the "hyperlinks" technique also exists. This technique enables a so-called "hypertext" document to refer to documents stored on remote servers.

According to its principle, these hypertext links consist of framing a word or phrase of an electronic document by a tag containing the address of the electronic document corresponding to the word or the phrase of the document dealt with.

In practice, these words or phrases thus framed by a tag are displayed on-screen in a particular color such that the user can click on one of them. The current document is then replaced on-screen by the document referred to by virtue of a program of browser type enabling the document associated with that tag to be searched for on the communication network.

SUMMARY OF THE INVENTION

This technique is very simple to use for referring to electronic documents distributed over several servers of a communication network.

The object of the invention is to provide a new method of executing on a communication network a computer program shared between a plurality of servers in a communication network, without the drawbacks of the state of the art.

To that end, a method of executing on a station of a communication network a computer program represented in a markup language comprises the following steps:

reading a tag comprising the identification of an instruction;

identifying an electronic address associated with said tag comprising the identification of an instruction;

comparing said electronic address with the local address of said station; and if said electronic address is different from said local address, sending a request to a server station of the network corresponding to said electronic address for obtaining the execution of said instruction.

Thus, by virtue of the introduction into a computer program of a tag including an electronic address referring to a sub-program, of hypertext link type, the execution of such a program is greatly facilitated from a station of a communication network.

Furthermore, whether this electronic address refers to the local address of the station on which the program is executed or to the address of a remote station of the communication network, the same referencing model may be used for the two types of function invocation.

This considerably facilitates the task of the programmer and, for certain parts of the computer program, makes it possible to pass from local instruction execution to remote instruction execution and vice-versa without drawback.

The same referencing model may be used whether for the execution of functions hosted on remote stations or for the updating or reading of variables stored in memory on remote stations.

Furthermore, the execution of such a computer program may perfectly well be carried out when the different sub-programs or functions are distributed between different servers in a communication network.

In particular, functions may be performed in an optimal manner by servers having processing capacities or characteristics adapted to those functions.

The invention thus generally makes it possible to execute computer programs referring to other computer programs via links of hypertext type.

According to a preferred feature of the invention, at the sending step, a request for the execution of the remote function is sent to the server station of the communication network.

Thus, the function may be remotely executed on the server hosting that function, by using the processing capacities of that server.

In a practical manner, the method of execution then comprises a step of receiving the result of execution of that function.

According to an alternative feature of the invention, at the sending step, a request for obtaining the code of the function to be executed is sent to the server station of the communication network.

Thus, the execution of the function is carried out directly on the station implementing the computer program, using the execution code received.

Preferably, this method further comprises a step of storing in memory said received code of the function, in order to enable the later use of this code in case of successive invocations of the function in the same computer program.

According to another feature of the invention, at the sending step, a request for obtaining a variable value is sent to the server station of the communication network.

Thus, a variable value may be obtained directly on the execution of the program from a server station of the network storing and regularly updating that variable value.

According to another alternative feature of the invention, at the sending step, a request for updating a variable is sent to the server station of the communication network.

The updating of a variable value may thus be executed remotely, and then a response be sent to the server station on which the main computer program is executed.

Preferably, this method further comprises a step of storing in memory said variable value extracted or updated.

This makes possible the later use of this variable in case it is successively used in the same computer program. This storage in memory furthermore enables the remote updating later on of the variable located on a server station of the communication network.

In a complementary manner, the present invention relates to device for executing on a station of a communication network a computer program represented in a markup language. This executing device comprises:

means for reading a tag comprising the identification of an instruction;

means for identifying an electronic address associated with the tag comprising the identification of an instruction;

means for comparing said electronic address with the local address of the station; and sending means adapted for sending a request to a server station of the network corresponding to said electronic address for obtaining the execution of said instruction, if said electronic address is different from said local address.

This executing device has features and advantages similar to those of the method of execution according to the invention.

The present invention also relates to a computer program comprising portions of software code adapted to implement the execution method according to the invention when said program is loaded onto a computer.

Finally it relates to means of storing information which are fixed or partially or totally removable, and adapted to store sequences of instructions of said execution program according to the invention.

In its practical application, the present invention lastly relates to a computer and to a communication network comprising means adapted to implement the execution method according to the invention.

Further particularities and advantages of the invention will emerge from the following description.

BRIEF DESCRIPTION OF THE DRAWING

In the accompanying drawings, given by way of non-limiting example.

DETAILED DESCRIPTION OF PREFERRED EMBODIMENTS

Figure 1A:
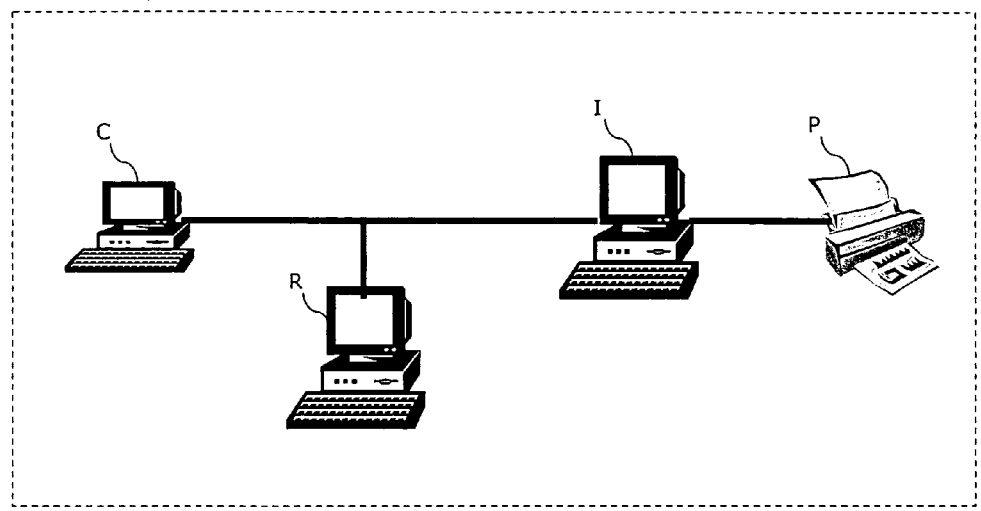
FIG. 1a illustrates a first communication network adapted to implement the execution method according to the invention.

First of all, the principle of the method of execution according to the invention will be described with reference to FIG. 1a illustrating a communication network adapted to implement this method.

Here, the communication network comprises three computers C, I, R.

A client computer C has neither printer nor capacity for intensive computation.

On the other hand, a second computer I is specialized in the printing of high resolution images, while a third computer R is specialized in operations of intensive computation.

In such a communication network, it is worthwhile to displace one or more sub-parts of a computer program in order to best use the processing capacities of each of the computers C, I, R.

A non-limiting example will be given below of a computer program adapted to be optimally shared in such a communication network.

In what follows, reference will be made to the programming language XPL ("eXtended Program Language"). This programming language is adapted to present computer programs using the syntax of the markup language XML ("eXtended Markup Language").

Of course, the present invention is not limited to such an XPL programming language but may be adapted to any other type of programming language using a markup language.

A program for rotating and printing of an image will be considered by way of example.

In a conventional manner, such a program could have the following form:

```
<xp:function name="printImage" args="pixels width height">
    <xp:loop var="i" start="1" stop="height">
        <xp:loop var="j" start="1" stop="width">
            <xp:print><xv:pixels at="i" at="j"/></xp:print>
        </xp:loop>
    </xp:loop>
</xp:function>
<xp:function name="rotateImage" args="pixels width height">
    <xp:loop var="i" start="1" stop="height">
        <xp:loop var="j" start="1" stop="width">
            <xv:pixels2 at="height-j+1" at="i">
                <xv:pixels at="i" at="j"/>
            </xv:pixels2>
        </xp:loop>
    </xp:loop>
    <xp:return>
        <xv:pixels2/><xv:height/><xp:width/>
    </xp:return>
</xp:function>
<xp:main args="pixels width height">
    <xp:printImage>
        <xp:rotateImage>
            <xv:pixels/><xp:width/><xp:height/>
        </xp:rotateImage>
    </xp:printImage>
</xp:main>
```

The above program is thus composed of three distinct functions:

a function for printing an image ("printImage"), a function for image rotation ("rotateImage"), a main function ("main") which connects the two preceding operations.

Returning to FIG. 1a, it is desirable to be able to divide up the preceding program into three independent sub-programs, stored respectively in the files print.xpl, rotate.xpl and main.xpl.

The file print.xpl, corresponding to the program for printing an image, is stored on the second computer I specialized in the printing of high resolution images, while the file rotate.xpl, containing the program for rotation of an image, is stored on the third computer R, specialized in operations of intensive computation.

Thus the functions "printImage" and "rotateImage" are no longer known by the main program main.xpl.

The program main.xpl is then modified in the following manner:

```
<xp:main args="pixels width height">
    <xp:printImage href="http://I/print.xpl">
        <xp:rotateImage href="http://R/rotate.xpt">
            <xv:pixels/><xp:width/><xp:height/>
        </xp:rotateImage>
    <xp:printImage>
</xp:main>
```

Thus, for each instruction referring to a function not available locally, the electronic address at which the definition of that function is to be found is indicated.

Here an instruction <xp:printImage> contains the electronic address "http://I/print.xpl" of the function "printImage" hosted on the second computer I which is specialized in image printing.

Similarly, the instruction <xp:rotateImage> contains the electronic address "http://R/rotate.xpl" corresponding to the address of the third computer R hosting the function "rotateImage".

By virtue of a minimal modification of the program, it is possible to easily displace the processing of a function to a remote computer of the communication network.

In the following description an instruction annotated by the attribute "href" will be termed a "hyper-statement".

Thus, the electronic address of the server hosting the function is stored in memory by virtue of an attribute of the tag defining the function.

As will be described in detail later with reference to FIG. 2 and following, the execution of such an instruction automatically generates a request for remote execution of the function associated with the electronic address.

Thus, a request for remote execution of the function "rotateImage" is sent to the third computer R.

In return, the client computer C receives a transformed image.

Similarly, the evaluation of the instruction <xp:printImage>, enables the automatic generation of a request for remote execution for the function "printImage", addressed to the second computer I specialized in printing techniques.

It will be shown in particular that it is not necessary to repeat the notation "href" on each hyper-statement of the same name. For example, if the function "rotateImage" is invoked several times at different places of the same computer program, it is sufficient to note it once with the attribute "href" in order for the computer program to know how to process these hyper-statements, by requiring the remote execution of the function on the remote computer.

As a variant, the remote functions may be declared in the header of a program.

The preceding programs may thus be written in the following manner such that the functions "rotateImage" and "printImage" are both considered a hyper-instructions:

<function name="rotateImage" href="http://R/rotate.xpl"/>

```
<xp:main args="pixels width height">
    <xp:printImage href="http://I/print.xpl">
        <xp:rotateImage>
            <xv:pixels/><xp:width/><xp:height/>
        </xp:rotateImage>
    </xp:printImage>
</xp:main>
```

Figure 1B:
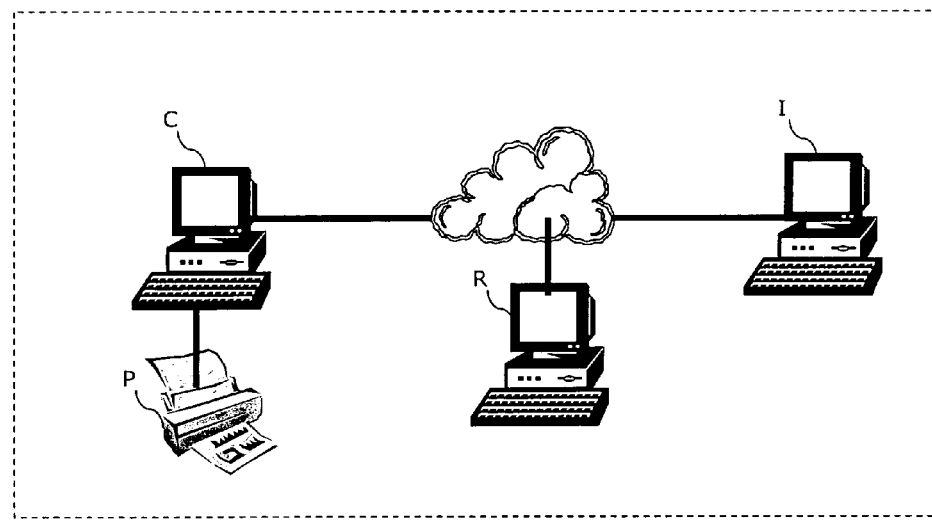
FIG. 1b illustrates a second communication network adapted to implement the execution method according to the invention.

A second embodiment will now be described with reference to FIG. 1b.

By contrast to the communication network illustrated in FIG. 1a, the second and third computers R and I are simple program servers, that is to say that they make available to the user the source code or executable of certain particularly useful programs.

These second and third computers R and I are not equipped with computational and printing capacities sufficient to implement the programs they host.

Thus, by way of example, the second computer I provides the code of the function "printImage" while the third computer provides the code of the function "rotateImage".

Thus the file print.xpl and the file rotate.xpl are hosted respectively on the second and third computer I and R.

Here, in contrast to the preceding embodiment, the client computer C is equipped with sufficient means to enable intensive computation and the printing of images.

In this type of network, the evaluation of a hyper-statement such as described previously automatically generates a request for obtaining the code of the function to be executed.

Thus, on evaluating the hyper-statement <xp:rotateImage> in the main program main.xpl, the interpreter automatically generates and sends to the third computer R a request for obtaining the file <rotate.xpl>.

In return, the client computer C receives the code of the function "rotateImage" so as to be able to execute it locally.

As will be described with reference to the following Figures, the code so obtained may be stored in a cache memory for a predetermined duration, in order to successively use that function on execution of the program.

The automatic generation and sending of a request for obtaining the file "print.xpl" is also addressed in a similar manner to the second computer I.

A method of executing functions hosted on remote stations has been described earlier.

This method of execution may apply in a similar manner to hyper-variables.

In a similar manner, a hyper-variable is an xpl variable to which an attribute "href" has been added in which the address may be stored of the server on which resides the content of the variable.

A hyper-variable enables in particular variables to be shared between a plurality of computer programs. Furthermore, a hyper-variable makes it possible to preserve information by displacing it to a server, which is generally better monitored and maintained than a client computer.

By way of example the use is given below of a hyper-variable in the function "printImage":

```
<xp:function name="printImage" args="pixels width height">
    <xp:loop var="i" start="1" stop="height">
        <xp:loop var="j" start="1" stop="width">
            <xp:print><xv:pixels
                href="http://R/pixels.xv"
                at="i" at="j"/>
            </xp:print>
        </xp:loop>
    </xp:loop>
</xp:function>
```

In this example, the function "printImage" is executed locally but, at each iteration, a request is sent to a server of the communication network at the address "http://R/pixels.xv", in order to obtain the content of a cell (i, j) of a table "pixels".

Figure 2:
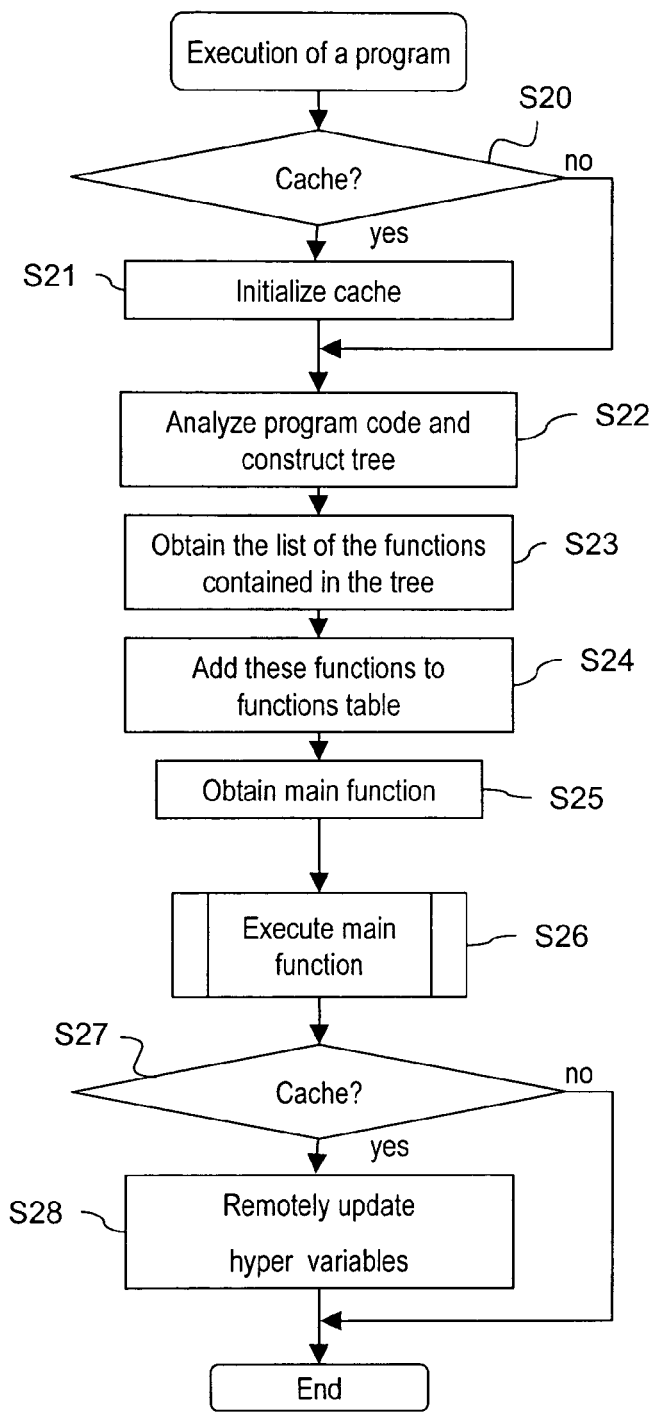
FIG. 2 is an algorithm illustrating a method of executing a program according to the invention.

With reference to FIG. 2 there will now be described the method of executing a program in accordance with the invention, in which the computer program comprises hyper-instructions, that is to say either hyper-functions, or hyper-variables, of which the content or the code is remotely hosted on a communication network.

The method of execution first comprises a test step S20 in which it is verified whether or not a there is a cache in the memory space of the client computer on which the program is executed.

If there is, this cache is initialized in an initialization step S21. At the outcome of this initialization or when there is no cache, a conventional step S22 of analysis of the program code is proceeded with in order to construct a tree. This analysis step S22 thus enables a syntactical tree to be parsed and constructed which corresponds to the nesting of the functions and instructions.

An obtaining step S23 next enables the list of the functions which are in that tree to be constituted.

These functions are next added in an adding step S24 to a conventional table of functions in which all the functions may be stored in association with their executable code.

In practice, the name of each function is stored in memory in association with the address of the node in the tree at which the execution code of the function is situated.

Next in an obtaining step S25 a main function is obtained, that is to say the function "main" of highest level in the tree in order to execute the program.

The group of steps S20 to S25 are conventional steps implemented on the execution of a program represented in an xpl language and do not require to be described in more detail here.

Figure 3:
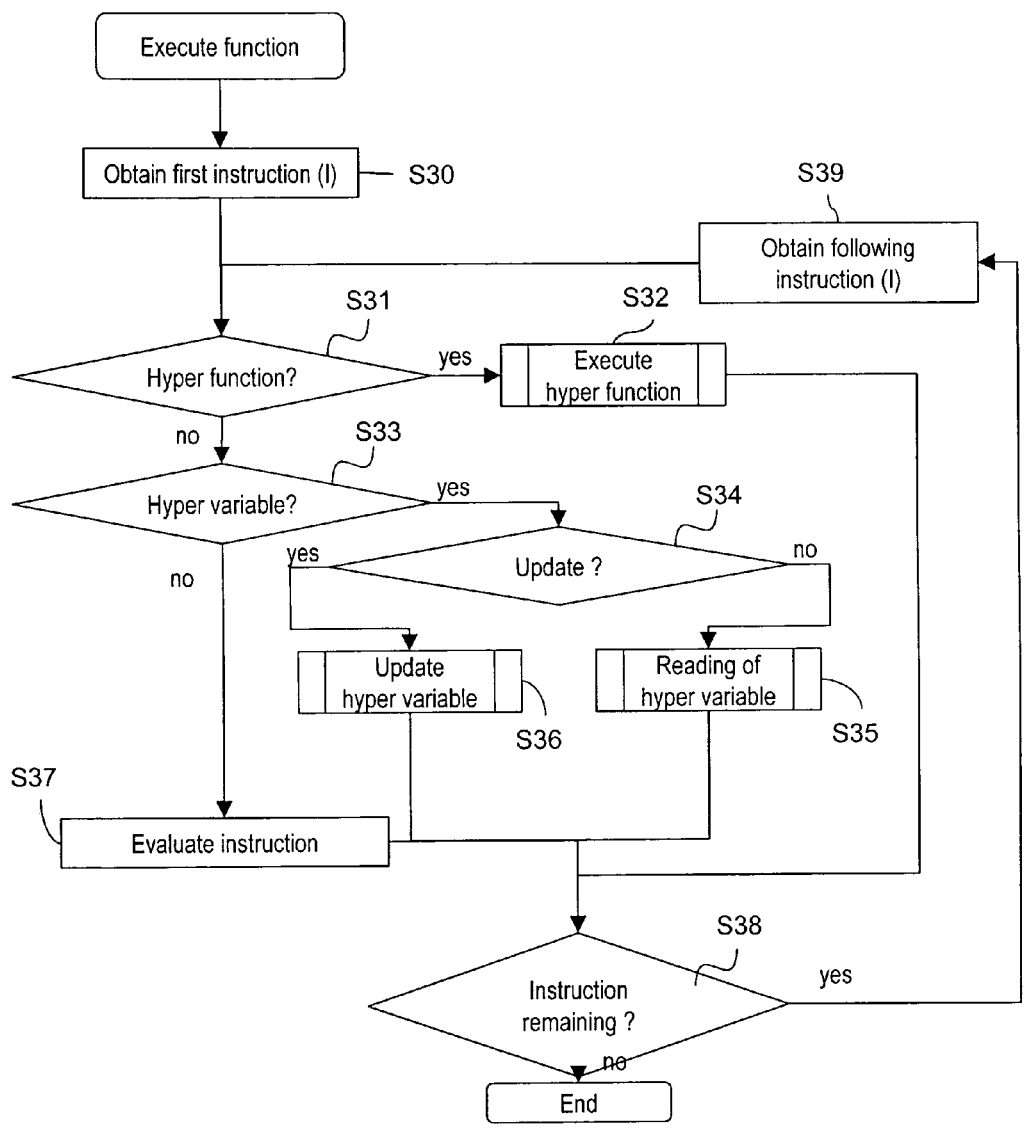
FIG. 3 is an algorithm illustrating the evaluation of the instructions of said program of FIG. 2.

An step S26 of actual execution enables this main function to be executed. This execution step S26 will be described with reference to FIG. 3.

In an obtaining step S30 the first instruction to be executed in that main function is obtained.

A test step S31 enables it to be verified whether that instruction is a hyper-function.

In practice, it is verified whether this is a tag incorporating the name of a function, associated with an electronic address for example in the from of an attribute via the reference "href".

If so, this hyper-function is executed in a step S32 which will be described later with reference to FIG. 3a.

Otherwise, a test step S33 enables it to be verified whether that instruction I is a hyper-variable.

Here too, it is verified whether this is a variable whose value is associated with an electronic address via the attribute "href".

If it is, another test step S34 enables it to be verified whether this is an update or not of the value of the variable.

In practice, the variables may be used either by the reading of a value, or by an updating of that value.

The distinction may be made according to whether or not a value in the tag is present.

For example, when it is a counter, a single tag <counter/> means that the value of the counter is to be read, whereas the tag <counter>10</counter> means that the value 10 of the counter is to be updated.

At the outcome of that test step S34, if it is negative, a step S35 of reading the value of a hyper-variable will be implemented as will be described in detail with reference to FIG. 3b.

If the result at the outcome of test step S34 is affirmative, when the variable must be updated, an updating step S36 will be implemented as will be described later with reference to FIG. 3c.

If, at the outcome of test step S33, the first instruction is not a hyper-variable, an evaluation step S37 is adapted to evaluate the instruction in a conventional manner, by executing it locally.

At the outcome of this evaluation step S37 or else of the steps of execution S32, reading S35, or updating S36, it is verified whether the main function comprises another instruction in a test step S38. If it does, the following instruction is considered in an obtaining step S39 and the group of steps S31 to S38 are reiterated for that following instruction.

When all the instructions of the main function have been processed, the evaluation program terminates.

Figure 3A:
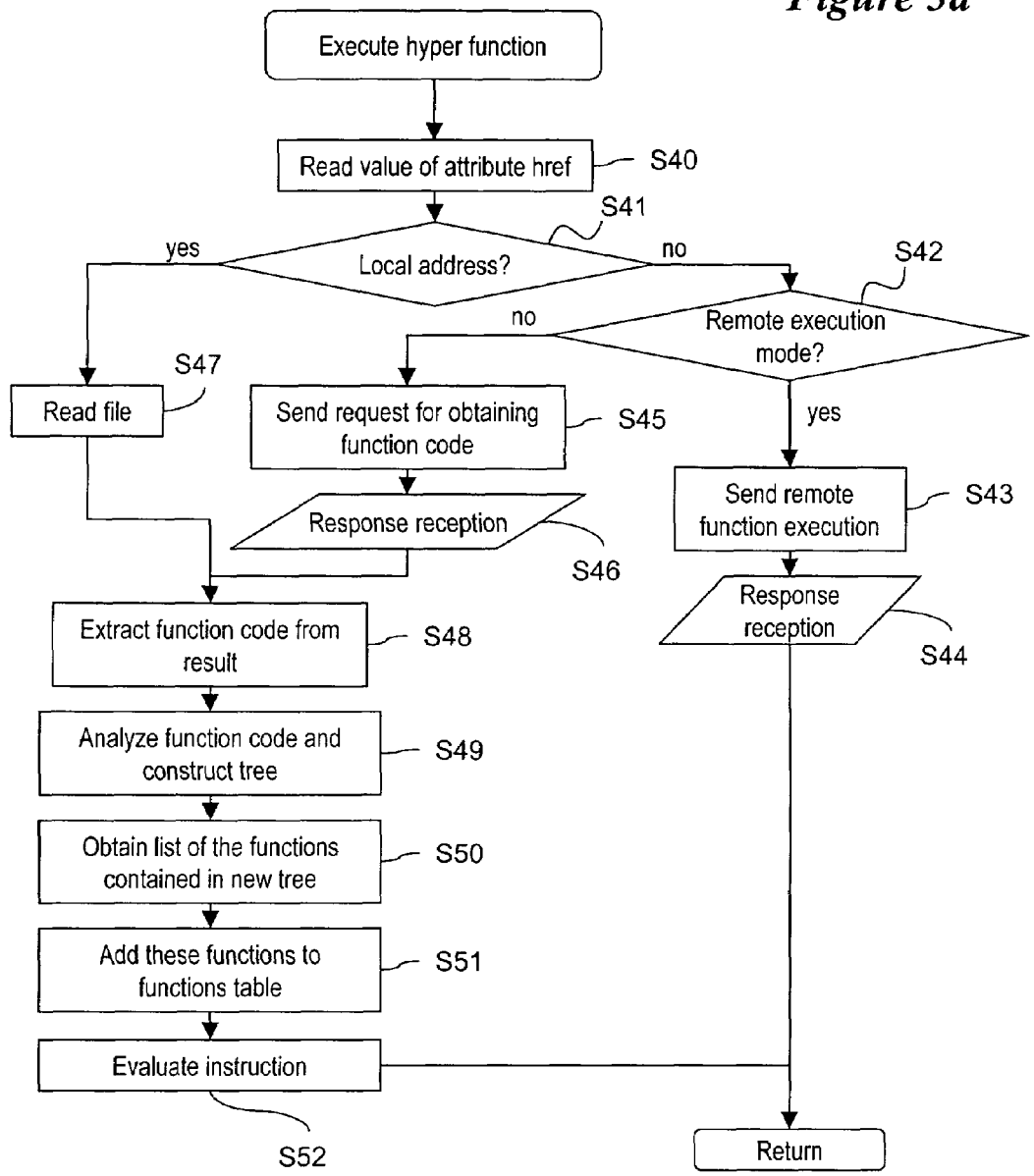
FIG. 3a is an algorithm illustrating the step of executing a hyper function of FIG. 3.

With reference to FIG. 3a the execution of a hyper-function in accordance with the first embodiment of the invention will be described.

In a reading step S40, the value of the attribute "href" is read.

In practice, this attribute comprises an address in the form of an electronic address of a server on the communication network.

In a comparing step S41, this electronic address is compared to the local address of the server executing the program.

If these addresses are different, the method of execution comprises a sending step to make it possible to obtain the execution of the function remotely hosted on another server of the communication network.

In practice, in a step S42 it is verified whether the execution mode of the function is a remote execution mode or not.

The execution mode of each function may be defined by a global mode associated with the local server executing the program, for example defined by the user. The user may arrange for all the functions to be executed remotely, on different servers of the communication network.

Alternatively, this execution mode of each function may be specific to each program, an attribute, associated with the computer program to be executed, defining an execution mode, either remote or not, of each function.

Finally, a third embodiment would consist of defining an execution mode specific to each function. Thus, in the computer program written in xpl language, an additional attribute could be associated with each function in order to define a remote execution mode or a local execution mode for each of these functions.

If the execution mode is a remote execution mode, a sending step S43 is implemented in order to automatically send a request to the server referred to by the electronic address for execution of the function remotely This remote server, after receiving that request, locally executes the function, then sends a response to the client server.

This response, thus corresponding to the execution of the function, is received in a receiving step S44.

The request and the response may be in xpl format.

If at the outcome of test S42, the execution mode of the function is not a remote execution mode, a sending step S45 is adapted to automatically send a request for obtaining the code of the function.

The remote server then sends the code of the requested function such that this response is received in a receiving step S46 on the client station.

Once the code has so been received, this function may be executed in a conventional manner on the client station, after an step S48 of extracting the code of the function.

This local execution is identical to that implemented by the server when, at the outcome of step S41, the electronic address stored in the attribute "href" associated with the function is the local address of the server executing the program.

If that is the case, a step S47 of reading the file stored locally is followed by the step S48 of extracting the code of the function.

At the outcome of this extracting step S48, an analyzing step S49 makes it possible as before to construct a tree based on the code of the function and an obtaining step S50 makes it possible to obtain the list of the functions contained in this new tree.

At an adding step S51, these functions are stored in the table of the functions.

These steps S49 to S51 thus correspond to a step of storing the code of the function in memory.

An evaluation step S52 next makes it possible to evaluate and to execute the function based on the functions stored in the table.

Figure 3B:
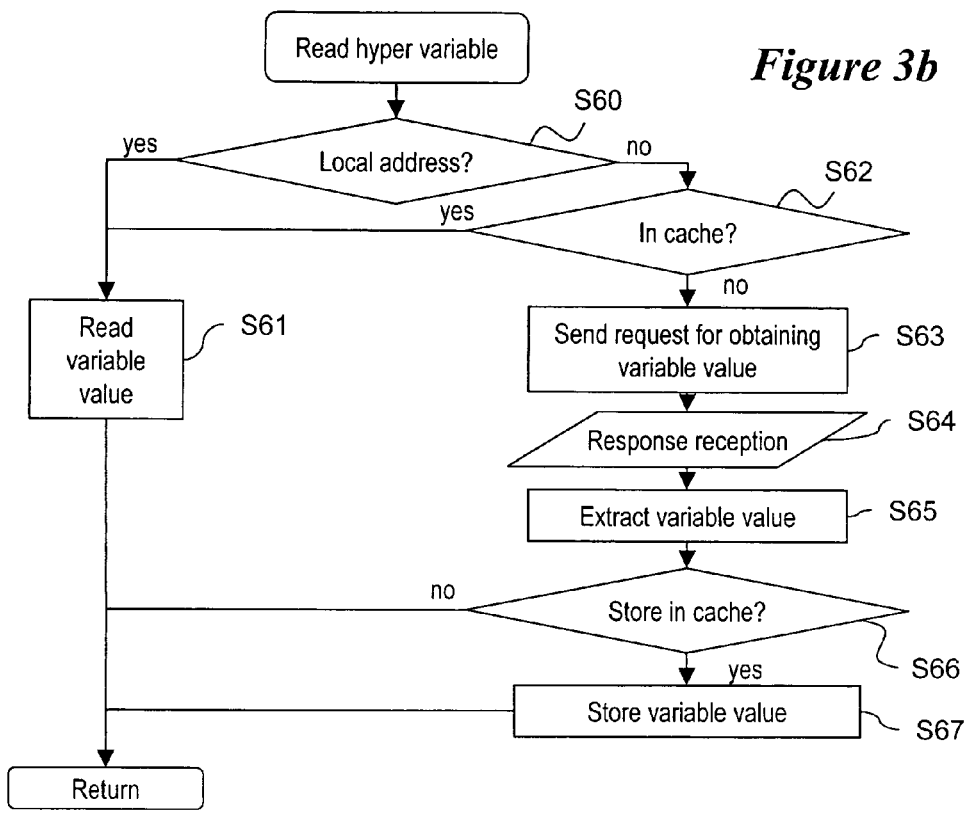
FIG. 3b is an algorithm illustrating the step of reading a hyper variable of FIG. 3.

With reference to FIG. 3b, the step S35 of reading the value of a hyper-variable will now be described.

In a test step S60 it is verified if the electronic address stored in the attribute "href" corresponds to the local address of the server executing the program or not.

If such is the case, a reading step S61 may be locally implemented directly on the station executing the program.

Otherwise, in a test step S62 it is verified whether or not that value is stored in a cache memory of the computer executing the program.

If such is the case, the reading step S61 is implemented in order to locally read that value, in the cache memory of the server executing the program.

Otherwise, a sending step S63 is adapted to send a request for obtaining the variable value. This request is sent to the electronic address of the station referred to by the attribute "href".

A receiving step S64 makes it possible to receive in response the value of the variable addressed by the remote server. An extraction step S65 enables this value of the response to be extracted. In a test step S66 it is verified if it is appropriate to store that value in cache memory or not. In practice, it may be worthwhile to store the variable value in a cache memory when that variable value is used successively in the same computer program.

If this is the case, a storage step S67 enables the variable value to be stored in the cache memory. This step S35 of reading a hyper-variable is thus completed.

Figure 3C:
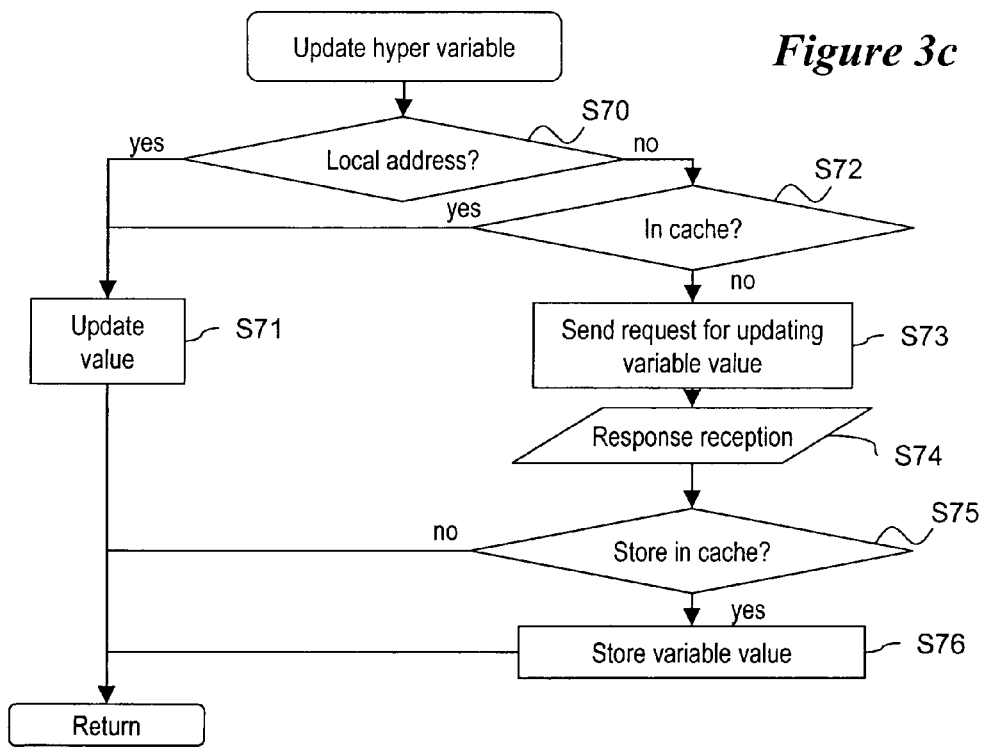
FIG. 3c is an algorithm illustrating the step of updating a hyper variable of FIG. 3.

In an alternative manner, the updating step S36 of FIG. 2, enabling a variable value to be updated, is illustrated in FIG. 3c.

As previously, it is verified in a test step S70 if the electronic address stored in the attribute "href" corresponds to the local address of the server implementing the method of execution of the program.

If it does, an updating step S71 is implemented in order to update the value of the variable based on the items stored on the local server.

Otherwise, a test step S72 makes it possible to verify whether that variable to be updated is already stored in a cache memory. If it is, the value of the variable is updated as previously, in an updating step S71.

Otherwise, a sending step S73 makes it possible to send a request for updating of the variable to a remote server situated in the communication network at the electronic address stored in the attribute "href" associated with that hyper-variable.

A receiving step S74 makes it possible to receive a response incorporating the update of that variable value. This updated variable value is extracted in an extracting step S75.

In a test step S76, it is verified whether or not the updated variable value must be stored in memory.

In the affirmative case, a step S77 of storing in memory enables the variable value to be stored in cache memory for its later use in the execution of the computer program.

These methods of processing of a hyper-function or of a hyper-variable as described previously with reference to FIGS. 3a, 3b and 3c thus enable, by virtue of the attribute "href", to process in a similar manner the functions or variables accessible on remote servers of the network or locally accessible.

Returning to FIG. 2, at the outcome of this step 26 of executing a main function, it is verified at a step S27 whether or not there is a cache memory on the local server.

If there is, an updating step S28 enables the hyper-variables to be remotely updated.

Thus, on the successive updating of a variable on a server executing a program, when that variable is stored in the cache memory of the computer, this updating step S28 makes it possible to return the updated value of the variable to a server of the communication network, for a later use by the same local station or by another station of the communication network.

Thus, in a relatively sample manner, this method of execution makes it possible to execute a computer program distributed over a communication network, using the processing capacities or the features of the different servers of the network.

In order to implement this method of execution, an executing device comprises means for reading each tag constituting the computer program in order to identify the instructions referred to in that tag. It also comprises means for identifying an electronic address associated with that tag, preferably in the form of an attribute (denoted "href").

Comparing means are adapted to compare that electronic address with the local address of the server hosting the executing device.

In accordance with the invention, this executing device comprises sending means adapted to send a request to a server station of the network corresponding to the electronic address read for obtaining the execution of the instruction when that electronic address is different from the local address of the server hosting the executing device.

This executing device also comprises means for receiving an execution result of a function or of a code of a function to be executed as well as means for storage in memory of the code of a function to be executed.

It also comprises means for memory storage of a variable value extracted or updated remotely.

Figure 4:
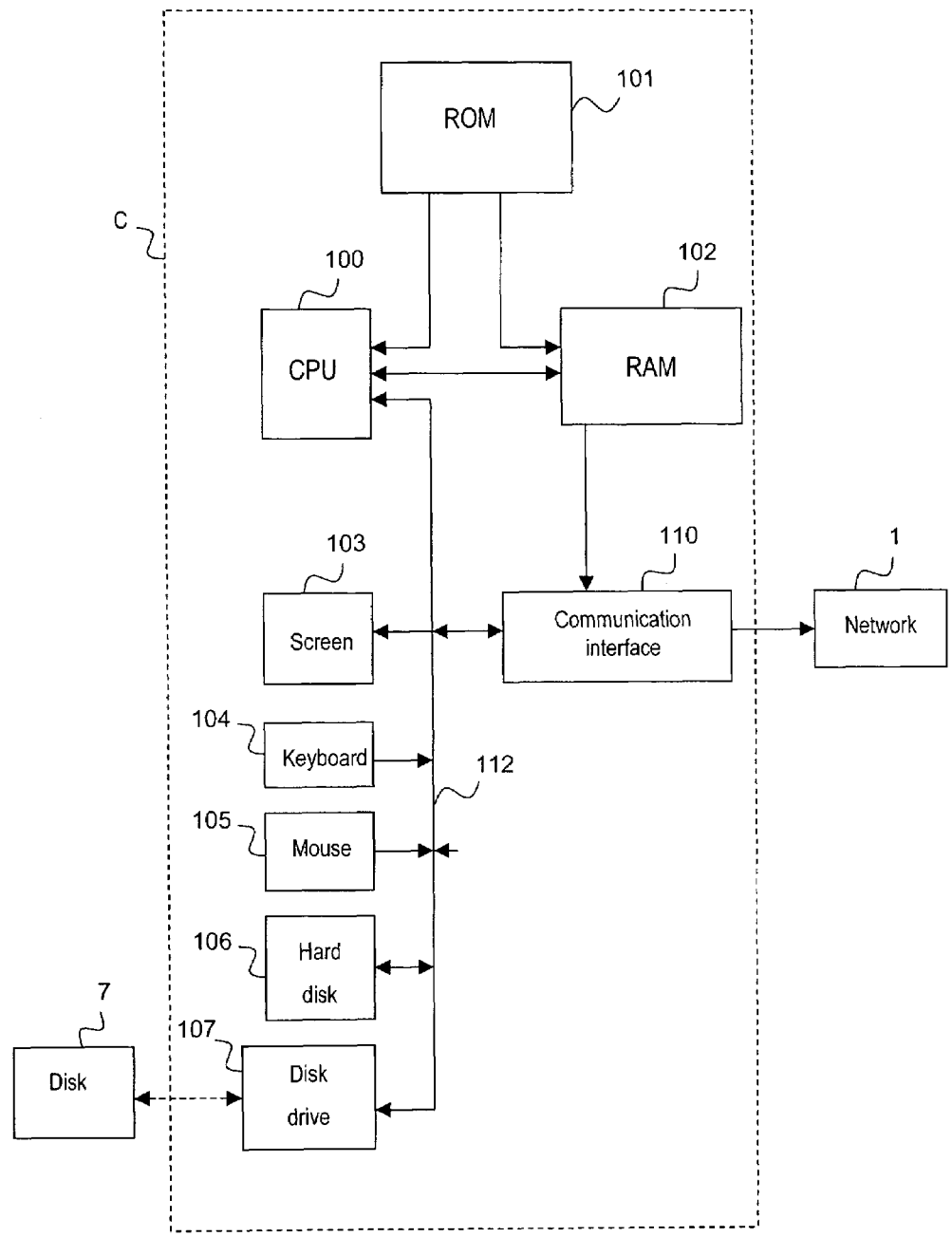
FIG. 4 is a block diagram of a computer adapted to incorporate an executing device according to the invention.

All these means are preferably incorporated in a computer as illustrated in FIG. 4.

In particular, the different means may be incorporated in a microprocessor 100, a read-only memory or ROM 101 being adapted to store in memory a program for execution of a computer program.

Thus, the execution device may be implemented in a computer connected to other server stations of a communication network 1.

A random-access memory or RAM 102 is adapted to store in registers the variables modified on execution of the execution program.

In particular, the random-access memory 102 is adapted to store the table of the functions and the different trees produced from the structure of the program.

This microprocessor 100 is integrated into a client computer C which may be connected to different peripherals, such as a printer, or to other computers of the communication network 1.

This computer C comprises a communication interface 110 connected to a communication network for receiving or transmitting messages or requests.

Here, in this embodiment, the requests may be established according to the communication protocol HTTP well known to the person skilled in the art.

The computer C furthermore comprises means for storage of documents, such as a hard disk 106 or is adapted to cooperate by means of a disk drive 107 (diskettes, compact discs or computer cards) with removable document storage means such as disks 7.

These fixed or removable storage means may furthermore contain the code of the execution method according to the invention which, once read by the microprocessor 100, will be stored on the hard disk 106.

As a variant, the program enabling the device to implement the invention can be stored in the read only memory 101.

As a second variant, the program could be received in order to be stored as described previously by means of the communication network 1.

The computer C also has a screen 103 which may for example serve as an interface with an operator with the use of the keyboard 104 or the mouse 105 or of any other means, and to display the data, for example the result of the computer program after its execution.

The central processing unit 100 (CPU) will execute instructions relating to the implementation of the invention.

On powering up, the programs and methods relating to the invention, stored in a non-volatile memory, for example the read-only memory 101, are transferred into the random-access memory 102, which will then contain the executable code of the invention as well as the variables necessary for implementing the invention.

A communication bus 112 affords communication between the different sub-elements of the computer C or connected to it. The representation of the bus 112 is non-limiting and in particular the microprocessor 100 is able to communicate instructions to all sub-elements directly or by the intermediary of another sub-element.

Naturally, numerous modifications can be made to the example embodiments described above without departing from the scope of the invention.

The invention claimed is:

1. A method of executing on a station of a communication network a computer program represented in a markup language using markup language tags, comprising steps of:

reading from said computer program a markup language tag in said markup language comprising identification of an instruction represented in said markup language, wherein said computer program comprising at least two instructions to be executed represented in said markup language and connected through a main function written in said markup language and having a corresponding main tag;

identifying an electronic address associated with said markup language tag comprising the identification of the instruction represented in said markup language;

comparing said electronic address with a local address of said station;

if said electronic address is different from said local address, sending a request to a server station of the communication network corresponding to said electronic address for obtaining an execution of said instruction represented in said markup language and executing said instruction at said server station after the requesting step;

if the electronic address refers to said local address of said station, executing said instruction by said station based on obtained code received from said server station;

at the sending step, sending a request for obtaining a variable value for the markup language tag to said server station of the communication network, or sending a request for updating a variable to said server station of the communication network;

storing in a memory said variable value;

remote updating of a variable of said server station of the communication network based on said variable value stored in the memory in accordance with the request for updating.

2. The method of execution according to claim 1, wherein the electronic address is recorded as an attribute of said markup language tag comprising the identification of the instruction represented in said markup language.

3. The method according to claim 1, wherein at the sending step, a request for remote execution of a function is further sent to said server station of the communication network.

4. The method according to claim 3, further comprising a step of receiving an execution result of said function from the server station.

5. The method according to claim 1, wherein at the sending step, a request for obtaining a code of a function to be executed is further sent to said server station of the communication network.

6. The method according to claim 5, further comprising a step of receiving said code of the function to be executed and a step of executing the function by said station.

7. The method according to claim 6, further comprising a step of storing in memory said received code of the function.

8. The method according to claim 1, further comprising a step of receiving a response to the request from the server station and extracting said variable value.

9. The method according to claim 1, wherein at the sending step, a request for updating a variable is further sent to said server station of the communication network.

10. The method according to claim 1, wherein said computer program is represented in a markup language using a syntax of a markup language XML.

11. The method according to claim 1, wherein the communication network implements a method of communication of HTTP type between server stations of said network.

12. A system for executing on a station of a communication network a computer program represented in a markup language using markup language tags, comprising:
    a processor; and
    a memory for storing instructions which, when executed by the processor, perform steps of:
    reading from said computer program a markup language tag in said markup language comprising identification of an instruction represented in said markup language, wherein said computer program comprising at least two instructions to be executed represented in said markup language and connected through a main function written in said markup language and having a corresponding main function tag;
    identifying an electronic address associated with said markup language tag comprising the identification of the instruction represented in said markup language;
    comparing said electronic address with a local address of the station; and
    sending a request to a server station of the communication network corresponding to said electronic address for obtaining an execution of said instruction represented in said markup language when said electronic address is different from said local address and executing said instruction at the server station after the requesting step;
    if the electronic address refers to said local address of said station, executing said instruction by said station based on obtained code received from said server station;
    at the sending step, sending a request for obtaining a variable value for the markup language tag to said server station of the communication network, or sending a request for updating a variable to said server station of the communication network;
    storing in a memory said variable value; and
    remote updating of a variable of said server station of the communication network based on said variable value stored in the memory in accordance with the request for updating.

13. The system according to claim 12, further comprising receiving, from the server station, an execution result of a function or receiving code of a function to be executed.

14. The system according to claim 13, further comprising storing in memory the code of the functions to be executed.

15. The system according to claim 12, further comprising storing in memory of an extracted or updated variable value.

16. A computer-readable memory storing a computer-executable program that, when executed by a computer, performs a method for executing on a station of a communication network a computer program represented in a markup language using markup language tags, the method comprising:
    reading from said computer program a markup language tag in said markup language comprising identification of an instruction represented in said markup language, wherein said computer program comprising at least two instructions to be executed represented in said markup language and connected through a main function written in said markup language and having a corresponding main tag;
    identifying an electronic address associated with said markup language tag comprising the identification of the instruction represented in said markup language;
    comparing said electronic address with a local address of said station;
    if said electronic address is different from said local address, sending a request to a server station of the communication network corresponding to said electronic address for obtaining an execution of said instruction represented in said markup language and executing said instruction at said server station after the requesting step;
    if the electronic address refers to said local address of said station,
    executing said instruction by said station based on obtained code received from said server station;
    at the sending step, sending a request for obtaining a variable value for the markup language tag to said server station of the communication network, or sending a request for updating a variable to said server station of the communication network;
    storing in a memory said variable value;
    remote updating of a variable of said server station of the communication network based on said variable value stored in the memory in accordance with the request for updating.

17. A method for executing on a station of a communication network a computer program represented in a markup language using markup language tags, said computer program comprising a main function written in said markup language and having a main function tag to be executed comprising at least one instruction represented in said markup language, said method comprising the following steps:
    executing said main function of the computer program associated with the main function tag;
    reading from said main function a markup language tag in said markup language comprising identification of an instruction represented in said markup language and connected to said main function written in said markup language;
    identifying an electronic address associated with said markup language tag comprising the identification of an instruction represented in said markup language;
    comparing said electronic address with the local address of said station;

if said electronic address is different from said local address, sending a request to a server station of the communication network corresponding to said electronic address for obtaining an execution of said instruction represented in said markup language and executing said instruction at said server station after the requesting step;

if the electronic address refers to said local address of said station, executing said instruction by said station based on obtained code received from said server station;

at the sending step, sending a request for obtaining a variable value for the markup language tag to said server station of the communication network, and sending a request for updating a variable to said server station of the communication network;

storing in a memory said variable value; and remote updating of a variable of said server station of the communication network based on said variable value stored in the memory in accordance with the request for updating.

* * * * *